United States Patent [19]

Anderson

[11] Patent Number: 5,306,351
[45] Date of Patent: Apr. 26, 1994

[54] WASTE OIL REMOVAL COMPOSITION AND METHOD

[76] Inventor: William J. Anderson, 16401 Woodstock La., Huntington Beach, Calif. 92647

[21] Appl. No.: 65,653

[22] Filed: May 21, 1993

[51] Int. Cl.$^5$ .................. B08B 3/04; B01F 17/50; B01F 17/54
[52] U.S. Cl. .................. 134/40; 134/22.18; 134/22.19; 134/25.1; 252/352; 252/356; 252/135
[58] Field of Search .............. 252/352, 356, 135; 134/22.12, 10, 22.13, 22.14, 22.16, 22.17, 22.18, 22.19, 25.1, 40

[56] References Cited

U.S. PATENT DOCUMENTS

| | | |
|---|---|---|
| 4,162,989 | 7/1979 | Flournoy et al. .............. 252/352 |
| 4,192,767 | 3/1980 | Flournoy et al. .............. 252/352 |
| 4,233,174 | 11/1980 | Sheridan .............. 252/170 |
| 4,469,603 | 9/1984 | Lepain et al. .............. 252/352 |
| 5,091,016 | 2/1992 | Krajicek et al. .............. 134/22.18 |
| 5,213,625 | 5/1993 | Van Slyke .............. 134/40 |

OTHER PUBLICATIONS

Union Carbide Chemicals and Plastics Co. Inc., Product Data Sheet, "Tritonx-100" Surfactant.

Primary Examiner—Neil M. McCarthy
Attorney, Agent, or Firm—Hawes & Fischer

[57] ABSTRACT

The composition and process of the present invention involves the use of a material at high pressure to dissolve, break up and move waste material, especially hydrocarbon based waste material, also known as fluidization. The composition is a dispersion fluid made from a dilute mixture of soy flour, lignin flour, citrus pectin, and sodium silicate. Additional components which may be added include sodium phosphate, soda ash, and a surfactant, non-ionic TRITON X100. The dispersion fluid is sprayed with high pressure, as needed, into the mass of material to be removed and then pumped out with the suction from a commercially available vacuum truck. A settling tank enables recirculation of the dispersion fluid to enable a recirculating process stream and to reduce the net amount of dispersion fluid utilized with a given amount of sludge to be removed.

11 Claims, 1 Drawing Sheet

WASTE OIL REMOVAL COMPOSITION AND METHOD

FIELD OF THE INVENTION

The present invention relates to the field hydrocarbon handling, removal, fluidization and clarification to enable re-utilization, recycling and further treatment rather than disposal. More specifically, the present invention permits a range of different techniques ranging from simple dispersion and transport, to purification through more refined processing.

BACKGROUND OF THE INVENTION

The past few decades have fostered the development of the environmental industry dedicated to minimizing the harm to the environment resulting from ordinary industrial activities. Both public and industry are increasingly aware of the harm caused by not taking steps to mitigate the effects of waste left in the environment. Simply not disposing of the waste environmentally and by the use of containment is extremely expensive.

In the case of the oil industry, waste build-up in tanks, settling ponds, and containment cellars cannot be simply left in tact, as if discarded. Not only would those structures represent a significant lost investment by virtue of the loss of their use, but corrosion and decay of those structures will eventually, even though slowly, produce the same effects as if the waste material had been discarded initially. The costs of site remediation is tremendous and will eventually, due to its magnitude of cost, end up as a social cost borne by the taxpayers.

Due to the production and use of hydrocarbon fuels in many countries a significant proportion of the waste problems are associated with hydrocarbon fuels. Since hydrocarbon constituents, especially the heavier components, may fall out of solution, significant buildup problems occur. These types of problems are particularly severe where the process conditions are such that the lighter less-viscous components are in a position to differentially leave the solution, or where the heavier components such as waxes are allowed to settle and become stuck together.

The nature and conditions under which hydrocarbons can collect and self-adhere are many and varied. Further complications are caused by other materials present in the environment where the hydrocarbon is collected. For example, in a refinery a hydrocarbon stream may be exposed to heavy metals which may accumulate along with the hydrocarbon. In oil fields, oil spillage about a well may collect with drilling mud in concrete cellars surrounding the well head. As can be seen, the presence of other materials can hamper disposal of the hydrocarbon waste for a number of reasons. Structurally the other materials can combine with the adhesive effect of the hydrocarbon to form a hard solid. Where the other materials predominate, the hydrocarbon can require bulk processing of a relatively larger mass of material to remove the same amount of hydrocarbon. In cases where other, relatively inert but structurally enhancing material is present, a hydrocarbon contaminated with heavy metals can inhibit the remediation process due to the hazards involved in physically separating the contaminated hydrocarbon even before the step of decontaminating the hydrocarbon takes place.

Another hurdle involves the physical mutation of the hydrocarbon mass into a form which is transportable. A highly viscous wax is not transportable with ordinary small diameter four or five inch lines using standard available vacuum trucks, most of which are usually capable of creating a vacuum of about twenty seven to twenty eight inches of water column. Where masses of hydrocarbon waste cannot be suctioned, personnel are usually required to manually separate the hydrocarbon material.

Having to place personnel in intimate physical contact with the hydrocarbon material can bring its own associated set of problems. Where the mass is relatively free of volatile components, significant amounts of physical exertion is required to break up the mass requiring expensive labor costs and downtime for equipment, tanks, etc.

In instances where the mass is laden with volatiles or hazardous materials, the procedures, personnel safety and protective equipment can significantly slow the removal process. Factors slowing the process include the daily decontamination of the personnel and equipment, the limitations of movement which the personnel are subject to with the heavy, bulky, cumbersome equipment, and the reduced exertion possible with the cumbersome equipment.

Further, the contaminated hydrocarbon mixture must be further disposed of, even after the personnel has collected it. In the case where it is contaminated, the high cost of processing may outweigh the high cost of hazardous waste disposal. The result is the utilization of valuable disposal space, a finite and costly resource. One of the main elements of cost of the decontamination process is the physical separation of the contaminated species from the non-contaminated species, to enable concentrated processing of the contaminated material in the most concentrated form possible.

If the initial transport of the hazardous material were coupled with the first step of separating the hazardous from the non-hazardous material, the eventual cost of de-contamination could be lessened, especially if the initial separation were not accompanied by a loss of concentration.

One of the further problems in removing contaminated hydrocarbons is related to the use of solvents to dissolve and make less viscous the hydrocarbon portion of the material, in order to facilitate the movement of the material, as through pipes and conduits by pumping. However, hydrocarbon solvents in order to actively dissolve the contaminated hydrocarbon must be of low molecular weight and therefore volatile. Working with volatile hydrocarbons represents an increase in the hazards rather than a decrease in the hazards. Moreover, the result, even if the solvent dissolution works, is a volume of hazardous material including a volume of water which may be from about three to five times the volume of the original contaminated mass. Further, the hazardous material rather than being more concentrated to facilitate further treatment is now more dilute. Thus an additional step must be performed to remove the solvent from both the hazardous material and the non-hazardous materials if any are present.

The removal of the solvent must be done in a way which will yield the return of the non-contaminated solvent. Such treatment usually involves a distillation tower. However, the introduction of a contaminated solid into a distillation tower will yield a bottoms product which is similarly difficult to remove, which will in effect begin the waste removal problem over again.

What is therefore needed is a method to cause hardened waxy waste to become sufficiently broken-up and non-viscous to enable its transport with ordinary pumping and vacuum apparatus, and which will not add significantly to the overall volume of the material to be removed. The method should not add to the steps necessary to de-contaminate the material to be removed to the extent necessary to eliminate or minimize the necessity for hazardous waste disposal space. The method, process and chemicals used should not add to the hazardous or cumbersome nature of the cleanup and removal operation.

SUMMARY OF THE INVENTION

The composition and process of the present invention involves the use of a material at high pressure to dissolve, break up and move waste material, especially hydrocarbon based waste material. The composition is made from a dilute mixture of soy flour, lignin flour, citrus pectin, and sodium silicate. Additional components which may be added include sodium phosphate, soda ash, and a surfactant, non-ionic TRITON X100. TRITON X100 is a commercially available octylphenoxypolyethoxyethanol surfactant. It is sprayed with high pressure, as needed, into the mass of material to be removed and then pumped out with the suction from a commercially available vacuum truck.

The material is water based, yet causes the hydrocarbon to become fluid and retards self-adhesion. The retardation of self-adhesion is sufficient for enabling removal. Once removed, the removed material may be placed in a settling tank to allow the hydrocarbon material to undergo separation from the water based dispersion solution, and re-adhesion if necessary.

In the settling tank, inorganic contaminants such as sand, dirt, etc., which have a greater affinity for the dispersion solution, will fall out of solution. This action can be enhanced with the use of greater pressure at the removal site, and or with the use of violent agitation before allowing to settle. Due to the density differences, the hydrocarbon material will float atop the water soluble dispersion solution, while the dirt and inorganic contaminants will fall to the bottom of the dispersion solution. This permits the dispersion solution to be redrawn from the middle of a settling tank and recycled through the system to be used to dislodge and transport more of the material to be removed.

DETAILED DESCRIPTION OF THE PREFERRED EMBODIMENT

Figure 1:
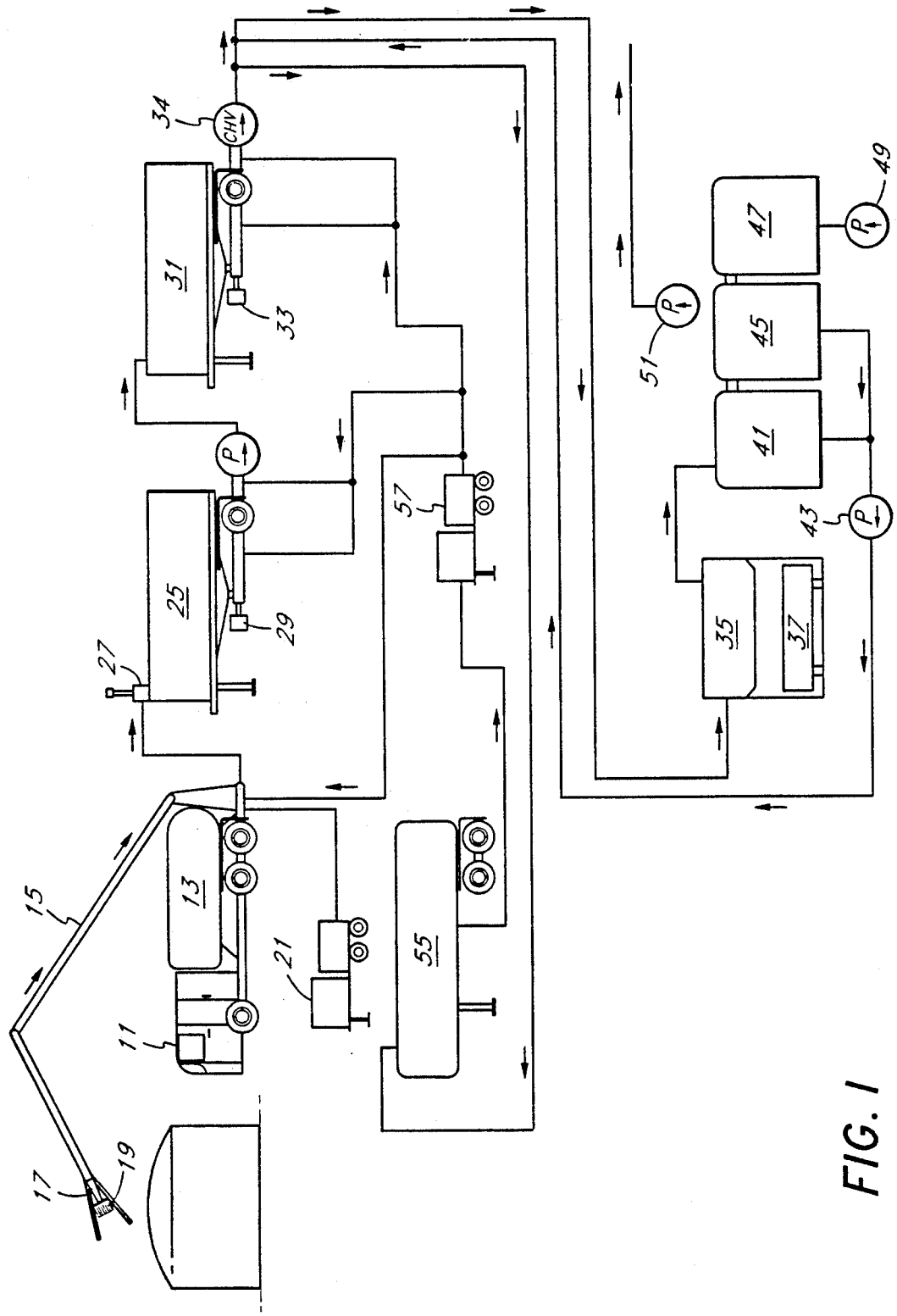
FIG. 1 is a schematic view of one possible configuration for removal and treating of a waste material at a site.

The description and operation of the invention will be best described with reference to several examples illustrating the breadth and proven abilities of the composition and method of the present invention. At the completion of the Examples, a description of FIG. 1 will show a deluxe schematic in which several process steps can be utilized simultaneously in a materials removal scenario.

EXAMPLE 1

Example 1 will illustrate the making of a working solution which is utilized in removing oil sludge, which will be referred to as the dispersion solution. The manufacture of the dispersion solution will occur in three steps, first, five gallons of a natural concentrate is made, followed by the formation of a one hundred gallon completed concentrate, and then followed by the formation of an eighteen hundred gallon dispersion solution.

First, a concentrated five gallon solution of soy flour, lignin flour and citrus pectin is prepared. Into a six gallon vessel, preferably having mechanical mixing capability, is first placed about four gallons of water. The additive components which will be used are as follows:

| | |
|---|---|
| Soy flour (powdered) | 1.0 pounds |
| Lignin flour (powdered) | 0.5 pounds |
| Citrus Pectin | 0.5 pounds |

First, the one pound quantity of soy flour is added to the four gallon quantity of water and mixed until smooth. Next, the one half pound of lignin flour is slowly added and mixed until the mixture is smooth. Next, the one half pound of citrus pectin is slowly added and mixed until the mixture is smooth. To the mixture is then added more water until the total liquid volume reaches five gallons. This mixture will be hereinafter referred to as the natural concentrate. The natural concentrate is then allowed to sit for 72 hours.

The soy flour may be commercially available from the A.E. Staley Company of Decatur, Ill., 62525. The lignin flour may be commercially obtained from Georgia Pacific Corporation of Atlanta, Ga. The citrus pectin may be obtained from Pectogel of Great Neck, N.Y., 11021.

The natural concentrate solution has the following composition:

| | |
|---|---|
| Soy flour (powdered) | 2.38% |
| Lignin flour (powdered) | 1.19% |
| Citrus Pectin (powdered) | 1.19% |
| Water | 95.23% |
| | 100.0% |

A silicate solution is formulated by first adding about forty gallons of water to a container, preferably a 125 gallon container. Next, fifty five gallons of sodium silicate is added to the forty gallons of water. The sodium silicate is commercially available under the trademarked name OXYCHEM, from Occidental Chemical Corporation, Niagra Falls, N.Y. 14302. This sodium silicate is a liquid having a density of about 11.67 pounds per gallon. The sodium silicate and water are mixed for about three minutes to form a sodium silicate—water mixture.

Next, the natural concentrate is added to the sodium silicate - water mixture, and mixed for about seven minutes to form one hundred gallons of the completed concentrate.

The completed concentrate has a composition by weight which is as follows:

| | |
|---|---|
| Sodium Silicate (liquid) $Na_2O \cdot XSiO_2$ | 62.951% |
| Soy flour (powdered) | 0.098% |
| Lignin flour (powdered) | 0.049% |
| Citrus Pectin (powdered) | 0.049% |
| Water | 36.853% |

-continued

| | 100.0% |

To the completed concentrate, 100 gallons, is added about 1700 gallons of water to yield an eighteen hundred gallon dispersion solution, which is the working solution utilized in removing the waste oil.

The completed dispersion solution has a composition by weight which is as follows:

| Sodium Silicate (liquid) $Na_2O.XSiO_2$ | 4.1975% |
|---|---|
| Soy flour (powdered) | 0.0065% |
| Lignin flour (powdered) | 0.0032% |
| Citrus Pectin (powdered) | 0.0032% |
| Water | 95.7896% |
| | 100.0% |

As an option, and for jobs where the material to be removed is particularly difficult, other materials may be added. One such material is sodium phosphate (powder) $Na_3PO_4$ which may be obtained from the Monsanto Chemical Company of St. Louis, Mo. Another such material which may be added is soda ash, $Na_2CO_3$ obtainable commercially from Van Waters & Rogers of San Mateo, Calif., 94403. Another material which ma be added is a surfactant, also known as non-ionic TRITON X100 which has a formula $C_{33}H_{60}O_{10.5}$, and which is available from Union Carbide of Danbury, Conn. Indeed other ingredients may be added to alter the performance of the dispersion solution.

Where needed, the sodium phosphate powder may be added in an amount of about ten pounds dry weight per 1800 gallons of dispersion solution. Similarly, the soda ash may be added in an amount of about ten pounds dry weight per 1800 gallons of dispersion solution. The TRITON X100 may be added in an amount of about one gallon of X100 per 1800 gallons of dispersion solution. In addition, it is permissible to add one, two, or all three of the above optional components per single 1800 gallon dispersion solution batch.

Once the dispersion solution is made, it is ready to be employed to disperse, fluidize and cause the waste material to be removed by pump. By fluidize, it is not necessarily meant that the sludge is reduced to a particular size. Indeed, it is contemplated that large lumps may exist within what is referred to as the fluidized sludge. The key to fluidization within the meaning of the instant application is the non cohesion of the mass and its ability to flow, even if such flow is of non-uniform size or lumpy. Further processing may be performed, as with an auger pump, etc. or grinder to further reduce the average size of the fluidized sludge.

In this Experiment 1, a 500,000 barrel storage tank which was about fifty feet tall and which had a diameter of about 276 feet developed a leak necessitating repairs. The tank's liquid hydrocarbon level was drawn down for repairs. After the tank was emptied, a layer of bottoms about three feet thick were exposed. Several attempts were made using hot water, heating coils and plows, but all were unsuccessful.

The dispersion solution is then pumped into and through a manual wand at the rate of four gallons per minute and at 1200 pounds per square inch. A manway was cut into the side of the tank and a four inch suction tube from a conventional vacuum truck was used to remove the dispersed hydrocarbon material. Workmen used the manual wand to break up the hydrocarbon material by holding the working end of the wand in the proximity of the hydrocarbon material. After being broken up, the hydrocarbon material flowed to the suction entrance of the four inch line from the vacuum truck and was removed through suction. The vacuum from the vacuum truck was approximately twenty seven to twenty eight inches of water column vacuum.

Breathing air was directed into the tank for the workers, safety and convenience. Once a large enough diameter of the three foot thick mass was removed such that the flowing gradient was severely diminished, workers with large flat rakes, or squeegees were employed to push the loosened material to the mouth of the suction line. Operations proceed intermittently for five weeks on a 24 hour basis. Five personnel were used, and the division of labor involved three within the tank performing various tasks such as moving the material about and towards the suction of the vacuum truck, one assigned to operate the vacuum truck and one performing the operations associated with the vacuum truck.

The dispersion solution was recovered from a settling tank and recycled into the tank. The total dispersion solution used, including recycle was less than 5,000 barrels. Due to the recycle of the dispersion solution, only 1000 barrels of dispersion solution was necessary. The total material removed from the tank was in excess of 10,000 barrels.

Several unexpected effects were noticed. First, the mist and spray created from the high pressure dispersion solution de-gassed the tank. When the personnel initially entered the tank, the hydrocarbon vapor residue from the tank required the personnel to initially begin with breathing apparatus to filter the fumes present. After a day of cleanup, enough of the mist of the dispersion solution was created and present in the tank to remove the hydrocarbon vapors present. Secondly, and as the bulk of the material was removed, it was discovered that the wands could be used as a water broom to not only fluidize the material present, but to sweep it towards the vacuum pipe, much as one uses the water pressure from a garden hose to clean a driveway.

EXAMPLE 2

In an oil production field, 108 containment cellars had become encrusted with hydrocarbon and contaminants, including drilling mud. Containment cellars are typically concrete structures surrounding the upper end of an oil well casing and are intended to catch and contain waste and debris in order to isolate it from entry into the ground soil. The containment cellars were required to be cleaned as a condition of transfer of the oil field. An amount of the dispersion solution was formulated as was described in EXAMPLE 1.

The containment cellars were about five to six feet deep and about eight feet wide by about 16 feet long. each contained about 50 barrels of heavy sludge, including drilling mud, dirt, and debris, and had not been cleaned for several years. Total sludge removal was approximately 5500 barrels. Three personnel were involved, including a vacuum truck operator, a job foreman and one person to administer the high pressure dispersion fluid. The fluid was pressurized from between 1200 to 3000 pounds per square inch. The same vacuum truck capable of producing a reduced pressure of about twenty seven to twenty eight inches of water column reduced pressure was utilized. The vacuum truck had a capacity of about 120 barrels.

EXAMPLE 3

A crude oil storage tank about twenty five feet tall and about 20 feet in diameter developed heavy sludge in the bottom after the free oil had been removed.

An amount of the dispersion solution was formulated as was described in EXAMPLE 1.

After equipment set up, about one hour was required to fluidize and pump approximately 100 barrels of heavy sludge from the storage tank to a baker tank located approximately 200 feet in altitude above the work area. The required working solution necessary to complete the job was about eight percent of the total removed sludge, or about eight barrels of the dispersion solution. The pressure at which the dispersion solution was applied was from about 1200 pounds per square inch to about 5000 pounds per square inch. Four personnel were involved, including a vacuum truck operator, a job foreman, one person to administer the high pressure dispersion fluid, and an additional person inside the tank.

EXAMPLE 4

A baker tank, which is typically about eight feet wide, twelve feet tall and about thirty five feet long had collected a large amount of sludge and waste oil products and was allowed to remain over an extended period. High pressure water was used in large volumes to remove the majority of the sludge. However, a volume of approximately one hundred twenty barrels of residue had accumulated on the internal surfaces and ledges of the tank which could not be removed by the high pressure waster method. The remaining material was sufficiently dry that it did not have any gravity slump and was free standing.

An amount of the dispersion solution was formulated as was described in EXAMPLE 1.

After equipment set up, the oil and sand material was fluidized and removed to an adjacent baker tank in less than one day. The addition in volume due to the dispersion solution was about 5% by volume. In the initial cleaning using the high pressure water, over 300% by volume was added to the amounts of sludge which were removed. Only two personnel were involved, one person to administer the high pressure dispersion fluid, and an additional person occasionally to help pump the material to the adjacent baker tank.

EXAMPLE 5

In an oil production field a set of filter beds were used to filter water resulting from an oil field flood operation. A malfunction in a control valve enabled oil to enter the filter beds, designed only for water phase filtration. The filter beds were totally clogged and unusable. The filter beds were garnet with an anthracite cap. The filter medium of garnet was arranged in three distinct layers including fine, medium, and coarse with a twelve inch deep charcoal anthracite cap.

An amount of the dispersion solution was formulated as was described in EXAMPLE 1.

The dispersion solution was introduced into the filters at a relatively low two hundred pounds per square inch pressure and circulated through the filter in a reverse or flush mode at low velocity. The fluid from the filters was passed through a clarifier and back into the filters to form a continuous loop back wash. Bubbles were introduced into the bottom of the filter to assist in creating local turbulence. Each of the four filters was about twenty five feet tall, and about twelve feet in diameter. The clarifier was a five thousand gallon tank, and oil was removed from the clarifier with a vacuum truck.

About 20,000 gallons of dispersion solution were circulated through the four filters to insure that the oil was thoroughly cleaned. This project required two days to clear the filter beds so that they could be returned to service. There was no disturbance of the layers of material comprising the filter elements.

EXAMPLE 6

In an oil production field a set of three 16,000 barrel storage tanks were scheduled for maintenance and repair. These tanks were the wash, settling, and shipping tanks for support of oil field operations, and consequently only one tank at a time could be taken out of service. The first tank selected contained from about eighteen to twenty inches of heavy free standing sludge across the bottom. This material was required to be removed, the inside of the tank was required to be cleaned so that the tank could be sand blasted and painted.

An amount of the dispersion solution was formulated as was described in EXAMPLE 1.

Two manways and the roof hatches were opened for ventilation purposes. A sump was lined in order to receive the sludge and debris as it was removed from the tank. Five personnel including a supervisor and four technicians used a chemical mixing truck, a five thousand pound per square inch water blaster, a pickup truck, a fresh air supply trailer and two ventilation fans.

The personnel used personal protective clothing, fresh air breathing apparatus and other safety equipment and worked either two or three at a time inside the first tank on a rotating basis. Of the technicians not in the tank, one was assigned to air pump watch duties and the other was assigned for safety reasons to watch the other men in the tank.

Initially, the sludge was fluidized from outside the tank and into the sump until sufficient area had been developed to allow the technicians to enter the tank. Eventually, the vacuum hose was transferred from the sump to a position inside the tank, and a duckbill intake was attached to the open end. The large amounts of rust and scale from the inside walls of the tank caused some plugging of the suction hoses. The sludge was removed from one tank in four days with the crew averaging about nine to twelve hours per day of work, especially since an additional person was not present to assist in moving the sludge as by squeegee to the opening of the suction line. From the first tank, 770 barrels of liquid was removed, including 70 barrels of dispersing fluid representing about ten percent of the volume added. With the exception of the scale, the vacuum trucks did not experience any problems in moving the liquid. It was estimated that the personnel were able to complete the work in approximately one third of the time and as compared to the traditional method of water flush. An additional benefit was that by minimizing the volume added to the sludge, the waste oil sump which serves the entire field was not overburdened.

As has been described in the forgoing examples, several configurations and methods of utilizing the dispersion solution of the present invention are possible. There is not only the possibility of great variation at a given level of activity, but even greater variation in the levels of activity as well as the degree of automation available in which to implement the use of the composition of the present invention and in which to practice the method of the present invention.

It is preferable to illustrate a system having a larger number of components and a higher level of automation to more fully illustrate the possibilities with which the system of the present invention may be practiced. Illustration of a more complete system enables contemplation of a greater degree of variation. It is understood that the configuration may be a simple as may be feasible to perform a simple job.

Referring to the Figure, a fluidizing unit 11 may be utilized which combines the functions of the vacuum truck and the high pressure pumping truck. The fluidizing unit 11 shown will have its oval tank 13 probably dedicated to vacuum service, and be outfitted with both a vacuum or suction pump, as well as a conventional liquids pump for pumping out liquid material from the oval tank 13. This is due to the consideration that the needs of a settling tank (to be shown) will vary greatly depending upon the job, as well as the rate of injection of the dispersion fluid.

In the Figure, the fluidizing unit 11 is outfitted with a boom 15 to facilitate the cleaning of hard to reach areas as well as to facilitate the use of the process without having to assign personnel to use the injection wand. In the illustration of the Figure, the boom 15 can be placed into one of the upper covers of a vessel to be cleaned and lowered all the way to the bottom of the vessel to be cleaned to begin breaking up the sludge on the bottom of a tank without the need for personnel to enter the tank. The boom 15 can be shifted from place to place in the bottom of the vessel to be cleaned with only slight hydraulic control.

The boom 15 of the Figure carries both the dispersion fluid and the suction tube for the return of the dispersed sludge. Such a configuration may also eliminate the need for opening the vessel to be cleaned at its ground level. Due to the length and height of the middle portion of the boom, it may be required to place a recovery pump 17 into the end of the boom, especially since the reduced pressure of the oval tank 13 will probably be insufficient to draw the dispersion fluid/sludge mixture through a suction line. It is understood that the recovery pump 17 may be placed elsewhere in the instance where a low level access to a vessel to be cleaned is available, and that a low level suction may be used in addition to the boom 15. Alternatively, the boom 15 may be dedicated to injection of the dispersion fluid while the pumping operations may be handled separately.

In any event, a flow occurs in both directions of the boom 15, dispersion fluid to the end and the dispersion fluid/sludge mixture from the end and into the oval tank 15. The end of the boom 15 may be fitted with a variable area spray nozzle 19 in order to more efficiently handle the sludge material. For example, where the sludge is only several inches thick, a wide spray from nozzle 19 may be sufficient to more quickly break up the sludge. Where the sludge has a depth of several feet, a center, single line spray from the nozzle 19 may be required to sufficiently fluidize the sludge.

Beneath the fluidizing unit 11 a hydraulic pump 21 is utilized to supply fluid power to the hydraulic actuators in the boom 15 to enable its articulation and movement in performing the sludge cleanup task. The remainder of the process configuration of the Figure will be described with respect to the flow of sludge from the vessel to be cleaned. Once the dispersion fluid/sludge mixture travels back through the boom 15, it may reside within the oval tank 13, which may or may not be under reduced pressure. If the suction of the sludge is accomplished without the recovery pump 17, or with an auxiliary pump/vacuum truck type reduced pressure, the oval tank 13 may be used as a vacuum truck tank, while removing the sludge pumped from the recovery pump 17 directly to another vessel.

In any event, the recovered sludge is pumped into a first holding tank 25, perhaps assisted by a grinder 27 to remove any large solids such as the chips of tank corrosion referred to in the examples. A pumping device, in this case an auger 29 is located at the bottom of first holding tank 25. The auger 29 uses a screw type transfer device to transfer the bottoms of first holding tank 25 into a second holding tank 31. Similarly, second holding tank 31 has an auger 33 to pump out its contents. The holding tanks serve to enable the most intimate contact between the sludge and the dispersion solution so that a more defined separation can be achieved later in the process stream. The augers 29 and 33 produce significant shearing and movement to assist in this task. Stirring and a mechanism for stirring may also be accomplished within the holding tanks 29 and 31. Note the lines attached to the augers 29 and 33 from the bottom of the Figure. These lines carry a small supply of fresh dispersion fluid and further assist in both fluidization and "washing" of the sludge/dispersion fluid mixture, and facilitate the pumping action of the auger in moving its material along.

From the second holding tank, the sludge/dispersion fluid mixture flows through a one-way, or "check" valve 34 before going into a cyclone 35. Just before reaching the cyclone 35, a quantity of the sludge/dispersion fluid mixture is re-injected into the line. After re-injection, the sludge/dispersion fluid mixture may well reach a flow rate of about 580 gallons per minute at this point in the flow scheme for a 100 gallon per minute sludge/dispersion fluid mixture flow into the boom 15. This increased flow is due to the continual introduction of more dispersion fluid because the configuration of the Figure is also for full clarification of the sludge/dispersion fluid mixture to fully separate the oil.

The cyclone 35 may be a single, or bank of cyclones. The cyclones purpose is to separate out the heavier material from the sludge, such as dirt and drilling mud. This type of material, since it has been cleaned of its oily layer may well be disposable by conventional landfill, or other disposal method. Where the sludge is pure drilling mud, it may be re-cycled and used in future drilling operations. A collection bin 37 will typically be provided to collect the clean, separated solids.

From the cyclone 35, the process stream is comprised of an oil phase in combination with the dispersion solution, assuming that all of the solid material is separated by the cyclones. The next portion of the process flow involves the separation of the oil phase and regeneration of the dispersion solution. The oil/dispersion solution then enters a first clarifier tank 41 through its upper reaches. First clarifier tank 41 has a bottom path connected to a circulation pump 43. The oil phase will remain at the top of the material within the first clarifier tank 41 while the clarifier solution which settles to the bottom is the dispersion solution.

The first clarifier tank 41 is connected to a second clarifier tank 45 through an upper connection. Second clarifier tank 45 also has a bottom path also connected to circulation pump 43. Second clarifier tank 45 is also connected to a third clarifier tank 47 through an upper connection, and to a separate pump 49. The third clarifier tank is intended to function as a standby tank, in the event of a failure in either of the first or second clarifier tanks 41 or 45.

An oil recovery pump 51 is located at the upper portion of the Figure, and serves to pump away the reclaimed oil which has settled at the top of the second clarifier tank 45. This flow path is indicated by a line leading off of the Figure with an arrow leading away from the oil recovery pump 51. The circulation pump 43 is used to re-inject the dispersion solution at a point upstream of the cyclones 35 and also back into a recycle loop within the system.

One path of the line from circulation pump 43 extends back to a makeup tank 55. A feed line extends from the makeup tank 55 to an injection skid 57. Output lines from the injection skid 57 extend to the fluidizing unit 11 where they will be directed into the vessel to be cleaned by the boom 15. Other output lines from the injection skid 57 extend to the auger pumps 29 and 33 to assure that the sludge is fully mixed with enough of the dispersion solution to insure full interaction and separation.

As was the case in the examples, the output line from the injection skid 57 which extends back to the boom 15 may have pressures ranging from a few hundred pounds per square inch to several thousand pounds of pressure. Also, as was the case with a wand, the volumetric flow through and pressure can be varied widely to insure effective waste oil/sludge removal. Since the composition of the present invention is water based and has been shown to be effective with hydrocarbons, it is clear that it may also be utilized to perform cleaning on other surfaces and materials irrespective of the nature of the material to be cleaned. This range of cleanable materials extends from polar solvents to hydrocarbons, in between and beyond the end points.

Further, it is contemplated that the basic formula disclosed herein is amenable to the addition of other chemicals, such as soaps, surfactants, and other materials having affinity for the sludge type material for which removal is sought.

While the present invention has been described in terms of a series of particular examples, one skilled in the art will realize that the composition, method of application and techniques of the present invention can be applied to many situations. The present invention may be utilized in any situation where cleanup with non-hazardous materials is a priority.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A concentrate composition for use in an oil removal dispersion solution comprising:
   about 0.1 weight percent soy flour;
   about 0.05 weight percent lignin flour;
   about 0.05 weight percent citrus pectin;
   about 62.95 weight percent sodium silicate; and
   about 36.85 weight percent water.

2. A dispersion solution for oil removal, including the concentrate recited in claim 1 and further comprising water added to said concentrate in the ratio of from about 10 to about 30 parts water to each part of said concentrate composition.

3. The dispersion solution for oil removal as recited in claim 2 wherein the ratio of said water to said completed concentrate composition is about 17 parts water to each part of said completed concentrate composition.

4. The dispersion solution for oil removal as recited in claim 3 and further comprising sodium phosphate added in the ratio of about ten pounds by weight of said sodium phosphate to about 1800 gallons of said dispersion solution.

5. The dispersion solution for oil removal as recited in claim 3 and further comprising soda ash added in the ratio of about ten pounds by weight of said soda ash to about 1800 gallons of said dispersion solution.

6. The dispersion solution for oil removal as recited in claim 3 and further comprising an octylphenoxypolyethoxy-ethanol non-ionic surfactant added in the ratio of about one gallon of said surfactant to about 1800 gallons of said dispersion solution.

7. A process of fluidizing and removing oily sludge from a site comprising the steps of:
   preparing a dispersion solution having the following composition:
      about 4.1975 weight percent sodium silicate;
      about 0.0065 weight percent soy flour;
      about 0.0032 weight percent lignin flour;
      about 0.0032 weight percent citrus pectin; and
      about 95.7896 weight percent water;
   applying said dispersion solution at high pressure to a sludge material to dislodge said sludge to form a fluidized sludge;
   removing said fluidized sludge from said site; and
   enabling said fluidized sludge to settle to enable the removal of said dispersion solution from said fluidized sludge.

8. The process of fluidizing and removing oily sludge material as recited in claim 7 and further comprising, after said enabling said fluidized sludge to settle step, the steps of:
   removal of the sludge material heavier than said dispersion solution; and
   removal of the sludge material lighter than said dispersion solution.

9. The process of fluidizing and removing oily sludge material as recited in claim 7 and further comprising the step of turbulent mixing of said fluidized sludge to facilitate intimate contact between said dispersion solution and said sludge, before performing said enabling said fluidized sludge to settle step.

10. The process of fluidize removing oily sludge material as recited in claim 9 and further comprising the step of introducing additional dispersion solution to said fluidized sludge during said turbulent mixing step.

11. The process of fluidizing and removing oily sludge material as recited in claim 7 and further comprising the steps of:
   removing said dispersion solution from said settled fluidized sludge; and
   using said removed said dispersion solution in said applying the dispersion solution at high pressure to a sludge material step.

* * * * *